(12) United States Patent
Graf et al.

(10) Patent No.: US 11,531,773 B2
(45) Date of Patent: *Dec. 20, 2022

(54) VERIFICATION OF BITSTREAMS

(71) Applicant: GRAF RESEARCH CORPORATION, Blacksburg, VA (US)

(72) Inventors: Jonathan Peter Graf, Blacksburg, VA (US); Ali Asgar Ali Akbar Sohanghpurwala, Blacksburg, VA (US); Scott Jeffery Harper, Blacksburg, VA (US)

(73) Assignee: GRAF RESEARCH CORPORATION, Blacksburg, VA (US)

( * ) Notice: Subject to any disclaimer, the term of this patent is extended or adjusted under 35 U.S.C. 154(b) by 200 days.

This patent is subject to a terminal disclaimer.

(21) Appl. No.: 17/134,704

(22) Filed: Dec. 28, 2020

(65) Prior Publication Data

US 2021/0117556 A1 Apr. 22, 2021

Related U.S. Application Data

(63) Continuation of application No. 15/686,661, filed on Aug. 25, 2017, now Pat. No. 10,902,132.

(51) Int. Cl.
*G06F 21/10* (2013.01)
*G06F 21/30* (2013.01)
(Continued)

(52) U.S. Cl.
CPC .......... *G06F 21/602* (2013.01); *G06F 21/577* (2013.01); *G06F 21/6245* (2013.01);
(Continued)

(58) Field of Classification Search
CPC .. G06F 21/602; G06F 21/577; G06F 21/6245; G06F 21/76; G06F 2221/033;
(Continued)

(56) References Cited

U.S. PATENT DOCUMENTS 8,473,754 B2 6/2013 Jones et al.
9,529,946 B1 * 12/2016 Schumacher ....... G06F 11/3062
(Continued)

FOREIGN PATENT DOCUMENTS

EP 3244326 11/2017
WO WO-2017161305 A1 * 9/2017 ............. G06F 21/10

OTHER PUBLICATIONS

Rajat Subhra Chakraborty; Indrasish Saha; Ayan Palchaudhuri; Gowtham Kumar Naik; Hardware Trojan Insertion by Direct Modification of FPGA Configuration Bitsteam; Year: Feb. 2013; vol. 30, Issue: 2; Magazine Article; Publisher: IEEE; pp. 45-54 (Year: 2013).*

(Continued)

*Primary Examiner* — Kendall Dolly
*Assistant Examiner* — Courtney D Fields
(74) *Attorney, Agent, or Firm* — Nixon & Vanderhye P.C.

(57) ABSTRACT

An apparatus, method, and system assess the trustworthiness of a design representation while maintaining its confidentiality and thwarting attempts at unauthorized access, misappropriation, and reverse engineering of confidential proprietary aspects of the design representation and/or its bit stream. A utility/tool is provided for trust assessment and verification of designs and/or bit streams. The utility/tool may be instantiated on a semiconductor device or implemented as a utility executable on a mobile computing device or other information processing system, apparatus, or network.

30 Claims, 8 Drawing Sheets

(51) Int. Cl.

| | |
|---|---|
| *H04L 29/06* | (2006.01) |
| *H04L 29/08* | (2006.01) |
| *H04L 9/32* | (2006.01) |
| *G06F 21/60* | (2013.01) |
| *H04L 9/06* | (2006.01) |
| *G06F 21/62* | (2013.01) |
| *G06F 21/76* | (2013.01) |
| *G06F 21/57* | (2013.01) |
| *H04L 9/08* | (2006.01) |
| *G09C 1/00* | (2006.01) |

(52) U.S. Cl.
CPC ............... *G06F 21/76* (2013.01); *G09C 1/00* (2013.01); *H04L 9/0618* (2013.01); *H04L 9/0894* (2013.01); *G06F 2221/033* (2013.01); *G06F 2221/2107* (2013.01)

(58) Field of Classification Search
CPC . G06F 2221/2107; G09C 1/00; H04L 9/0618; H04L 9/0894
See application file for complete search history.

(56) References Cited

U.S. PATENT DOCUMENTS

| | | | |
|---|---|---|---|
| 2002/0199110 A1 | 12/2002 | Kean | |
| 2007/0168730 A1* | 7/2007 | Memmi | G01R 31/3177 714/30 |
| 2008/0270805 A1* | 10/2008 | Kean | G06Q 30/06 713/189 |
| 2016/0098561 A1* | 4/2016 | Keller | G06F 21/566 726/24 |
| 2016/0197616 A1 | 7/2016 | Cocchi et al. | |
| 2018/0139110 A1* | 5/2018 | Johnson | H04L 41/5054 |

OTHER PUBLICATIONS

U.S. Appl. No. 15/686,661, filed Aug. 25, 2017; Graf et al.
Office Action dated Jun. 28, 2019 for U.S. Appl. No. 15/686,661, 28 pages.
Final Office Action dated Jan. 13, 2020 for U.S. Appl. No. 15/686,661, 19 pages.
Notice of Allowance dated Sep. 18, 2020 for U.S. Appl. No. 15/686,661, 16 pages.
Florian Benz et al., "Bil: A Tool-Chain for Bitstream Reverse-Engineering," 22nd International Conference on Field Programmable Logic and Applications (FPL), Aug. 2012, 4 pages.
Jean-Baptiste Note et al., "From the Bitream to the Netlist," FPGA '08 Proceedings of the 16th International ACM/SIGDA Symposium on Field Programmable Gate Arrays, Feb. 2008, 8 pages.
Eric Love et al., "Proof-Carrying Hardware Intellectual Property: A Pathway to Trusted Module Acquisition," IEEE Transactions on Information Forensics and Security, vol. 7, No. 1, Feb. 2012, 16 pages.
Jonathan Graf et al., "The Integrity of FPGA Designs: Capabilities Enabled by Unlocking Bitstreams and 3rd-Party IP," Secure Computing and Communications Group, Luna Innovations Incorporated, Mar. 2012, 5 pages.
Jonathan Graf et al., "Private Verification for FPGA Bitstreams," Mar. 20, 2017, 4 pages.
Amir Moradi et al., "On the Vulnerability of FPGA Bitstream Encryption Against Power Analysis Attacks: Extracting Keys from Xilinx Virtex-II FPGAs," CCS ' 11 Proceedings of the 18th ACM Conference on Computer and Communications Security, Oct. 2011, 13 pages.
International Search Report and Written Opinion of the International Searching Authority dated Oct. 15, 2018 in PCT/US18/43215, 14 pages.
Christian Krieg; Clifford Wolf; Axel Jantsch; "Malicious LUT: A stealthy FPGA Trojan injected and triggered by the design flow"; 2016 IEEE/ACM International Conference on Computer-Aided Design (ICCAD); Year: Nov. 2016; Conference Paper; Publisher: IEEE; pp. 1-8.

\* cited by examiner

VERIFICATION OF BITSTREAMS

CROSS REFERENCE TO RELATED APPLICATIONS

This application is a continuation of U.S. patent application Ser. No. 15/686,661, filed Aug. 25, 2017, the entire contents of which are incorporated herein by reference in this application.

FIELD

The present invention relates to evaluation/verification techniques used to develop trust in microelectronics design representations. In particular, a unique paradigm of "Private Verification" (PV) is introduced herein for use in assessing and/or verifying the trustworthiness of a proprietary microelectronics device design representation without exposing proprietary details of the design representation or its corresponding bit stream design implementation format.

BACKGROUND

Known assessment/verification techniques conventionally used to develop trust in microelectronics design representations typically require the comprehensive exposure of the implementation details of the design. However, primarily out of concerns of propriety and trade secrecy, public exposure of such design details is typically not desired. Rather, what is needed and preferable is a better balance between the degree of exposure required for an accurate verification of a particular design representation and the amount of confidentiality/privacy that can be retained concerning the design. That is, it would be highly desirable to have access to a utility or tool that is capable of assessing and/or verifying the trustworthiness of a microelectronics device design representation without exposing either its actual design or bit stream implementation format details to access or scrutiny by the utility/tool user. For example, in the case of 3rd-Party Intellectual Property (3PIP), most IP vendors would like to keep certain physical and operational details undisclosed and confidential so as to safeguard their proprietary designs. In some cases, a bit stream format for the design implementation of a microelectronics device may itself have particular aspects that are proprietary. One noteworthy type of microelectronics device that may involve both proprietary implementation details (e.g., via 3PIP) and a proprietary design format is a Field-Programmable Gate Array (FPGA), a type of reconfigurable semiconductor device that can be reprogrammed to provide new or different gate connection logic configurations. This is because an FPGA "Bitstream", being a sequence of binary bits used to describe the configuration data to be loaded into an FPGA or for specifying a particular logic design(s) implemented in an FPGA device, often utilizes proprietary formats which are typically closely held by the device vendors.

Presumably, the primary reason for using confidential proprietary bitstream formats for FPGA devices is to protect the logic designs deployed on these devices, each of which is uniquely specified by an associated bitstream design file that shares the confidential proprietary format. If Bitstream design file formats were made public or open-sourced, the intellectual property contained within deployed bitstreams could be accessed by third parties without permission. Some security conscious FPGA vendors may choose to make use of Bitstream encryption and/or other confidentiality measures. However, the bitstream format itself is usually always kept confidential to serve as either the only IP protection or as an element of a more comprehensive IP protection scheme.

Thus, in order to address the industry's concerns for maintaining the propriety of certain IP and to enhance the ability to do so while conducting a process of evaluation or verification of a microelectronics design representation, a novel method and utility/tool is disclosed herein for assessing/verifying the trustworthiness of a particular microelectronics device design without exposing the details of the design, or a corresponding design implementation bit stream format, to a user of the assessment/verification utility/tool.

BRIEF DESCRIPTION AND SUMMARY

A "private verification" (PV) method and tool is described herein for performing trust assessments, verification and/or validation of microelectronic device design representations in a manner that provides and maintains confidentiality of the design itself and/or any corresponding proprietary bitstream file format and prevents unauthorized scrutiny, unauthorized access, misappropriation and reverse engineering of the design representation or its corresponding bitstream design file format. The PV method/tool disclosed herein simultaneously meets at least two desirable objectives: (1) to comprehensively assess the trustworthiness of a microelectronics design representation and (2) to maintain the confidentiality/privacy of proprietary aspects of the design—such as, for example, its hardware implementation, design details and/or Bitstream data format.

FIG. 1 diagrammatically illustrates a general instance of a "Private Verification" (PV) tool 100 in accordance with an exemplary embodiment of the presently claimed invention. The PV Tool (100) is configured to process a "public" design description (101) that describes the expected dimensions or properties contained in a particular "private" implementation (102). In the context of the present discussion and disclosure, the term "public" is used to mean visible/accessible to the PV tool user, while the term "private" means not visible/accessible by the PV tool user. Typically what is permitted as "public" are certain metrics relating to particular test(s) performed upon the design representation and a decision as to whether those metrics indicate both a properly implemented circuit and the absence of undesired content (e.g., errors, bugs, defects, hardware Trojans), while that which is maintained as "private" are typically design implementation details and/or the specific design implementation format used.

The provided "Public Description" 101 source should provide enough information to make an autonomous assessment/verification of trustworthiness possible while not giving away proprietary implementation details or other design information that is meant to remain private. The "Private Implementation" source 102 contains the actual design implementation details/information required to produce the device, and thus may contain proprietary information which is undesirable to expose. For a particular microelectronic device design, what is "private" may be either the implementation details or the implementation format or both. In this generalized example, the PV Tool 100 accepts, privately reads and processes both the Public Description 101 and the Private Implementation 102, including any proprietary details obtained from Private Implementation 102. PV Tool 100 then produces a "Public Report" 103 which assesses and describes the degree to which the information in Public description 101 matches the information in Private Implementation 102.

The general PV Tool method 100, as outlined in FIG. 1, may be implemented either in part or whole as one or more software processes executed by one or more hardware devices, computer processors or processing systems. A particularly useful example application of the PV Tool method 100 is in the evaluation of FPGA bitstreams. Typically, FPGA Bitstream formats are closely held proprietary formats unique to each FPGA vendor. Thus, it is not only the design inside the FPGA bitstream that is desired to be kept private—it is also the format of the bitstream itself. While the PV Tool proposed herein must be aware of the FPGA bitstream format and how to interpret the bits within that bitstream, it cannot expose that proprietary format to the tool user. Consequently, it is not acceptable to reverse engineer a FPGA bitstream using known or conventional techniques that convert the bitstream into a netlist for further evaluation via conventional netlist verification methods. Although reverse engineering techniques may be useful in verifying a bitstream, most conventional reverse engineering approaches typically do so at the expense of the privacy of the bitstream format as well as the design inside the bitstream. Thus, while reverse engineering approaches may be useful, they typically don't provide a vendor with the desirable benefits that a "private" verification technique could.

An exemplary non-limiting illustrative implementation of the PV Tool 100 that is particularly suited for evaluation and verification of FPGA bitstreams is the method and tool described herein with reference to FIG. 2 as PV-Bit utility/tool 200. While an acceptable Public Description 101 of an FPGA design could take on a variety of different formats, the several non-limiting example embodiments of PV-Bit tool 200 disclosed herein are described with respect to a Public Description in the form of a placed and routed "netlist" (referred to herein as a "Placelist"), since typically this is the form of a last publicly verifiable representation (i.e., verifiable in a manner which is accessible by the designer) that is commonly used in conventional FPGA design synthesis flows.

A "netlist" is a description of the connectivity of an electronic circuit. In its simplest form, a netlist consists of a list of the electronic components in a circuit and a list of the nodes they are connected to. Placelist information conventionally comprises a structural netlist of logic element primitives and associated electrical connections describing physical electronic components/resources, placement constraints and routing structures (or descriptions of how the components/resources are connected together) for a particular semiconductor chip, and include the placement and routing information necessary to produce the set of masks or bitstream used to create or instantiate an integrated circuit. Bitstream data conventionally is binary data representative of a particular configuration of FPGA physical resources within one or more geographical regions/tiles on the semiconductor chip. Typically, the Bitstream data directly represents physical resources within a semiconductor chip configuration matrix where portions of the matrix represent configurable resources within a specific geographical region or "tile" on the FPGA device.

At least one useful and beneficial aspect of the PV Tool method and the PV-Bit tool/utility described herein is that it enables a private and secure comparison of trust characteristics between a publicly documented description of an FPGA placed-and-routed physical netlist (the "Placelist") and an implemented FPGA configuration file (i.e., an FPGA "Bitstream" file).

Another useful and beneficial aspect of the PV Tool method and the PV-Bit tool/utility described herein is its ability to provide increased security and greater efficiency in evaluating an FPGA Bitstream by creating an intermediate file/descriptor that uses an undisclosed proprietary binary format.

A further useful and beneficial aspect of the PV Tool method and PV-Bit utility/tool described herein includes heuristic filtering of processing results to eliminate or at least reduce the production of false indications of potential trust violations ("false positives") and/or unintentional reveals of any significant details of a proprietary Bitstream format within an output trust evaluation/verification report which might result in enabling a user to perform reverse engineering of sensitive IP or the Bitstream formatting.

The "Private Verification" method and "PV-Bit utility/tool" described herein puts trust analysis of FPGA designs within the reach of the FPGA developer by enabling developers to perform the trust analysis themselves. Depending on the specific security requirements for a particular design, the Private Verification method and PV-Bit utility/tool described herein eliminates or at least significantly reduces the costs of using a third party to evaluate the design representation for trustworthiness. The PV-Bit utility/tool disclosed herein enables any user to evaluate content of an FPGA device Bitstream and its corresponding publically available Placelist to assess and/or verify whether the Bitstream contents matches the Placelist contents, and to do so without exposing either the Bitstream format itself or the proprietary design information contained within the Bitstream to access or scrutiny by the user.

Those of ordinary skill in the art will better appreciate the features and aspects of the example embodiments described and disclosed herein upon review of the following drawing Figures and detailed description.

BRIEF DESCRIPTION OF THE DRAWINGS

These and other features and advantages provided by the exemplary non-limiting illustrative implementation will be better and more completely understood by referring to the following detailed description in connection with the drawings, of which.

DETAILED DESCRIPTION OF EXEMPLARY EMBODIMENTS

Figure 1:
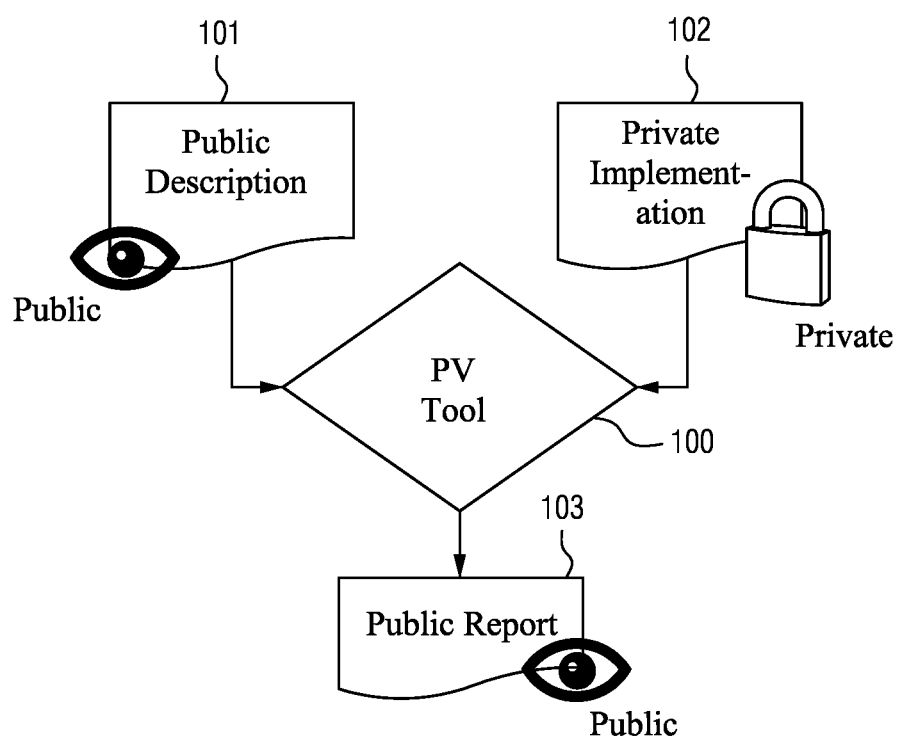
FIG. 1 is a high level functional diagram illustrating inputs and outputs for a general instance of the Private Verification (PV) tool/method disclosed herein.

Exemplary non-limiting illustrative implementations of a microelectronics design representation assessment/verification method and tool that preserves confidentiality of a proprietary design representation and/or its corresponding design implementation format are now described. The exemplary method and software tool disclosed herein may be used, among other things, for maintaining the confidentiality of a particular microelectronics device design representation and/or a particular design implementation format while performing an assessment/verification of that design representation so as to prevent unwanted or unauthorized access, misappropriation and reverse engineering of the design representation or a corresponding implementation format.

Reference will now be made in detail to non-limiting example embodiments which are illustrated in the accompanying drawings. Each example is provided by way of explanation, not limitation. It will be apparent to those skilled in the art that modifications and variations can be made to the disclosed embodiments without departing from the scope or spirit of the appended claims. For instance, features illustrated or described as part of one embodiment may be used on another embodiment to yield a still further embodiment. Thus, it is intended that the present invention covers such modifications and variations as come within the scope of the appended claims and their equivalents.

The system and method discussed herein may make reference to processors, servers, memories, databases, software applications, and/or other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among the components. For instance, computer-implemented processes discussed herein may be implemented using a single server or processor or multiple such elements working in combination. Databases and other memory/media elements and applications may be implemented on a single system or distributed across multiple systems. Distributed components may operate sequentially or in parallel. All such variations as will be understood by those of ordinary skill in the art are intended to come within the spirit and scope of the present subject matter.

When data is obtained or accessed between a first and second computer system, processing device, or component thereof, the actual data may travel between the systems directly or indirectly. For example, if a first computer accesses a file or data from a second computer, the access may involve one or more intermediary computers, proxies, or the like. The actual file or data may move between the computers, or one computer may provide a pointer or metafile that the second computer uses to access the actual data from a computer other than the first computer.

The various computer system(s) discussed herein are not limited to any particular hardware architecture or configuration. Embodiments of the methods and systems set forth herein may be implemented by one or more general-purpose or customized computing devices adapted in any suitable manner to provide desired functionality. The device(s) may be adapted to provide additional functionality, either complementary or unrelated to the present subject matter. For instance, one or more computing devices may be adapted to provide the described functionality by accessing software instructions rendered in a computer-readable form. When software is used, any suitable programming, scripting, or other type of language or combinations of languages may be used to implement the teachings contained herein. However, software need not be used exclusively, or at all. For example, as will be understood by those of ordinary skill in the art without required additional detailed discussion, some embodiments of the methods and systems set forth and disclosed herein may also be implemented by hard-wired logic or other circuitry, including, but not limited to application specific circuits. Of course, various combinations of computer-executed software and hard-wired logic or other circuitry may be suitable, as well.

It is to be understood by those of ordinary skill in the art that embodiments of the methods disclosed herein may be executed by one or more suitable computing devices that render the device(s) operative to implement such methods. As noted above, such devices may access one or more computer readable media that embody computer-readable instructions which, when executed by at least one computer, cause the at least one computer to implement one or more embodiments of the methods of the present subject matter. Any suitable computer-readable medium or media may be used to implement or practice the presently-disclosed subject matter, including, but not limited to, diskettes, drives, and other magnetic-based storage media, optical storage media, including disks (including CD-ROMS, DVD-ROMS, and variants thereof), flash, RAM, ROM, and other solid-state memory devices, and the like.

An example trust evaluation and assessment/verification tool, PV-Bit (200), for implementing the above described PV Tool method of FIG. 1 is described herein below with reference to FIG. 2. The PV Tool method and example PV-Bit tool for assessment/verification of FPGA Bitstreams described herein enable a secure and private comparison of the design properties/characteristics of a particular FPGA design/device as specified by its publically documented placed-physical netlist ("Placelist") and its corresponding "implemented" FPGA configuration file (i.e., an FPGA "Bitstream"), as a detected divergence in design properties between the Placelist and the Bitstream may be indicative of untrustworthy content (e.g., a hardware Trojan) or result due to other issues (e.g., bugs, defects, errors).

Figure 2:
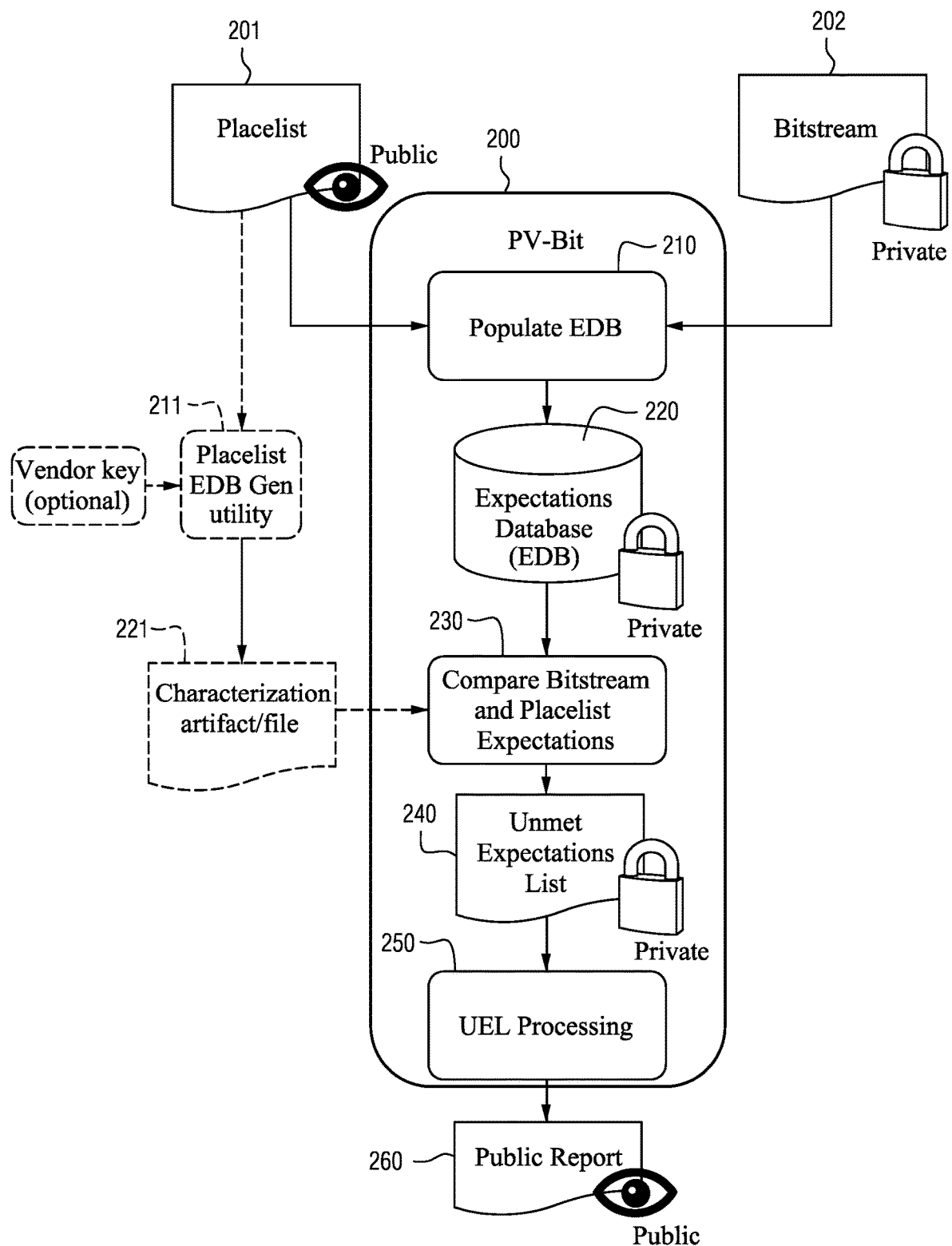
FIG. 2 is a process flow diagram illustrating a non-limiting example implementation of the PV-Bit utility/tool and processes performed by it.

It is contemplated by the inventors that the described PV-Bit tool 200 of FIG. 2 may be realized via a combination of both software and dedicated hardware logic or solely as a single software tool executed via one or more hardware information processing devices/platforms. In at least one non-limiting example embodiment, PV-Bit 200 is contemplated as a software utility/app that when executed by a computer processor or the like controls the processor to at least obtain/accept, read and parse input files containing FPGA Bitstream data and a corresponding an FPGA Placelist, create and compare database entries and generate a report indicating the results of the comparison for providing assessment/verification of trust in the FPGA design representation.

One example implementation of the FIG. 2 process for assessing the trustworthiness of FPGA design representations is contemplated as a single software utility. The PV-Bit software utility 200, when executed by a processor, parses an FPGA Placelist and a corresponding Bitstream into "intermediate characterization" data representing various design "expectations". Preferably, these intermediate characterization data structures or design "expectations" are generated by the PV-Bit software utility in an undisclosed proprietary digital data format to provide enhanced security of the design information against hacking attempts. Alternatively, the generated intermediate characterization data structures may be encoded or encrypted. The data structures are then entered into a database (EDB) stored within an accessible memory device. The data structure entries created from the Placelist information are then cross-checked/compared against the data structure entries created from the Bitstream data to identify entries which have no matching corresponding entries (herein referred to as "Unmet Expectations"), which may subsequently be revealed to a user as part of a generated output public report. This very basic example implementation of the PV-Bit tool described above for provides a means for allowing a user to at least assess the trustworthiness of a vendor's FPGA design without enabling the user to access or hack proprietary information from either the Bitstream data or the PV-Bit utility/tool itself and without generating any artifacts that might expose proprietary information about the design itself or the Bitstream format to the PV-Bit utility/tool user.

The "Placelist" 201 shown in FIG. 2 refers to information typically made publically available by vendors which describes a particular FPGA design in the form of a structural/physical "netlist" comprising "primitives" (i.e., component/part "instances") that map to configurable logic blocks, configurable hard-IP, and inter-block connectivity corresponding to configurable conductive connection routing resources. For example, vendors of FPGA devices may provide such Placelist information to prospective customers/end users by using an openly documented file format or a query interface that either explicitly describes the physical resource configuration and routing structures for the device (e.g., see Xilinx XDL, Vivado TCL Interface) or, alternatively, they may provide an "implied Placelist" as a back-annotated structural netlist along with certain placement constraints for the primitives (e.g., see Intel, Altera, Microsemi). The Bitstream 202 shown in FIG. 2 refers to FPGA Bitstream configuration data, typically produced and provided by the FPGA or IP core designer/developer, more directly represents actual physical resources of an FPGA or other semiconductor chip microelectronic device within a configuration matrix where portions of the matrix represent configurable resources within a specific geographical region or "tile" on the FPGA device or chip.

Expected logical/functional properties and configurations of the various physical resources defined in Placelist 201 and by FPGA Bitstream data 202, referred to herein as design "expectations", are generated as sets of "intermediate characterization" data structures which are collected and populated (210) into an Expectations Database (EDB) 220. Each of the generated design "expectations" essentially consisting of concise descriptive information about the physical resources or logical structures (i.e., the configurable logic, IO, hard-IP, and routing resources) to be formed within the particular semiconductor chip microelectronic device or FPGA device, including information about the physical placement of the logic resources and the electrical connections routing between the resources on the FPGA/chip device. The generated sets of EDB descriptive design expectation data structures corresponding to the information in the Placelist and in the Bitstream data essentially capture all of the essential aspects of an FPGA or other microelectronic device design which are specified in both the Placelist and Bitstream and which are "expected" to be found as being the same or at least consistent between the Placelist 201 information and the Bitstream 202 data. As previously mentioned, one contemplated example expression of the generated design "expectations" may take the form of a data structure/file of digital data provided in an undisclosed proprietary binary format.

The process block 210 in FIG. 2 represents a process of distilling/parsing of the information/data obtained from both Placelist 201 and Bitstream 202, the generating of this parsed/distilled information into respective sets or lists of design "expectations", and a subsequent populating of an Expectations Database (EDB) 220 with these generated expectations. In a preferred implementation, at least the Bitstream expectations data structures generated by PV-Bit tool 200 are created having a proprietary and undisclosed binary bit format to prevent user access to sensitive/proprietary design information. Alternatively, the generated expectations may be conventionally encoded or encrypted by PV-Bit tool 200 prior to being stored in Expectations Database 220 or used in further processing steps. Although not explicitly shown in FIG. 2, it is also contemplated that Bitstream data 202 may also be received as encrypted or encoded data and that the PV-Bit utility or the computing device/platform on which it is used performs an appropriate decryption or decoding of the Bitstream data prior to parsing and generating the Bitstream expectations.

At a next process block 230, the generated Placelist expectations and the generated Bitstream expectations are then compared based upon a set of appropriate predetermined metrics. The comparison results of this process are ultimately used to generate a report or an output indicative of the degree to which they match (or the degree to which they do not match) or at least some indication of the level of trustworthiness of the Placelist or Bitstream design representations. In this regard, the PV-Bit utility/tool 200 is configured to perform simple and computationally efficient binary comparisons between the EDB expectations for specific configurable resources without resorting to time-consuming formal equivalence checking using inefficient conventional assessment/verification techniques. In an ideal case, an exact match between EDB expectations generated from a Placelist and those generated from a corresponding Bitstream would be realized. However, certain design optimizations, errors, defects, bugs and/or any malicious insertions introduced during the implementation process will result in mismatches between the EDB expectations files generated for the Placelist and the EDB expectations files generated for a corresponding Bitstream. Therefore, for this example, PV-Bit tool 200 is also configured to generate records of "unmet" expectations, as indicated at process block 240.

These generated records of "unmet" expectations are organized into lists or information sets and may be stored as one or more Unmet Expectations List (UEL) files within a separate memory or as a separate part of the EDB. Preferably, the Unmet Expectations in these UEL files are also generated as encoded or encrypted data structures to protect any potentially sensitive proprietary information which they might reveal. Ultimately, a list of these unmet expectations may be generated and provided to the user in an output Public Report 260. Alternatively, the PV-Bit tool 200 may be configured to forgo generating and outputting an unmet expectations list and, for example, output a report providing only a simple "Match" or "Does Not Match" response to indicate whether or not the Bitstream and Placelist both contain the exact same design information. Likewise, the PV-Bit tool 200 may instead be configured to provide any type of output or provided any information as a "public report" 260 that is in some manner indicative of the trustworthiness of the design representation—based upon the result of the comparing of Placelist expectations with Bitstream expectations.

It is also contemplated by the inventors that any information from the UEL 240 be produced and included in output Public Report 260 in a manner that ensures the details provided in the Public Report do not reveal sufficient information to enable the PV-Bit tool to be used as an indirect means of reverse engineering the FPGA Bitstream. Accordingly, an enhanced implementation of PV-Bit tool 200 would include further UEL processing, indicated at block 250, wherein the UEL files are further processed using one or more predetermined selective information filters/techniques. One example would be to provide processing that removes any potentially sensitive information from the Unmet Expectations List/Report which might enable reverse engineering of sensitive IP or bitstream formatting. For example, entries in the UEL may be processed against a set of heuristic filters to ensure that any unmet expectations in the UEL files which relate directly to information contained in the bitstream will not be output in the Public Report 260. The particular heuristic rules to be used in this processing can be developed/provided by the EDA vendor, IP vendors, or even end-users of the PV-Bit tool. Another example would be to provide specific additional processing for eliminating or at least reducing the generation of "false positives" of trust violations produced by benign optimizations or modifications to the FPGA circuit that may have been introduced via the EDA implementation process. For example, an additional or specific heuristic filter could be used at block 250 for filtering out common optimizations based on specific vendor and/or designer supplied rules. After the further UEL processing/filtering at block 250, a final list of unmet expectations is then generated and provided to the user in output Public Report 260.

Figure 3:
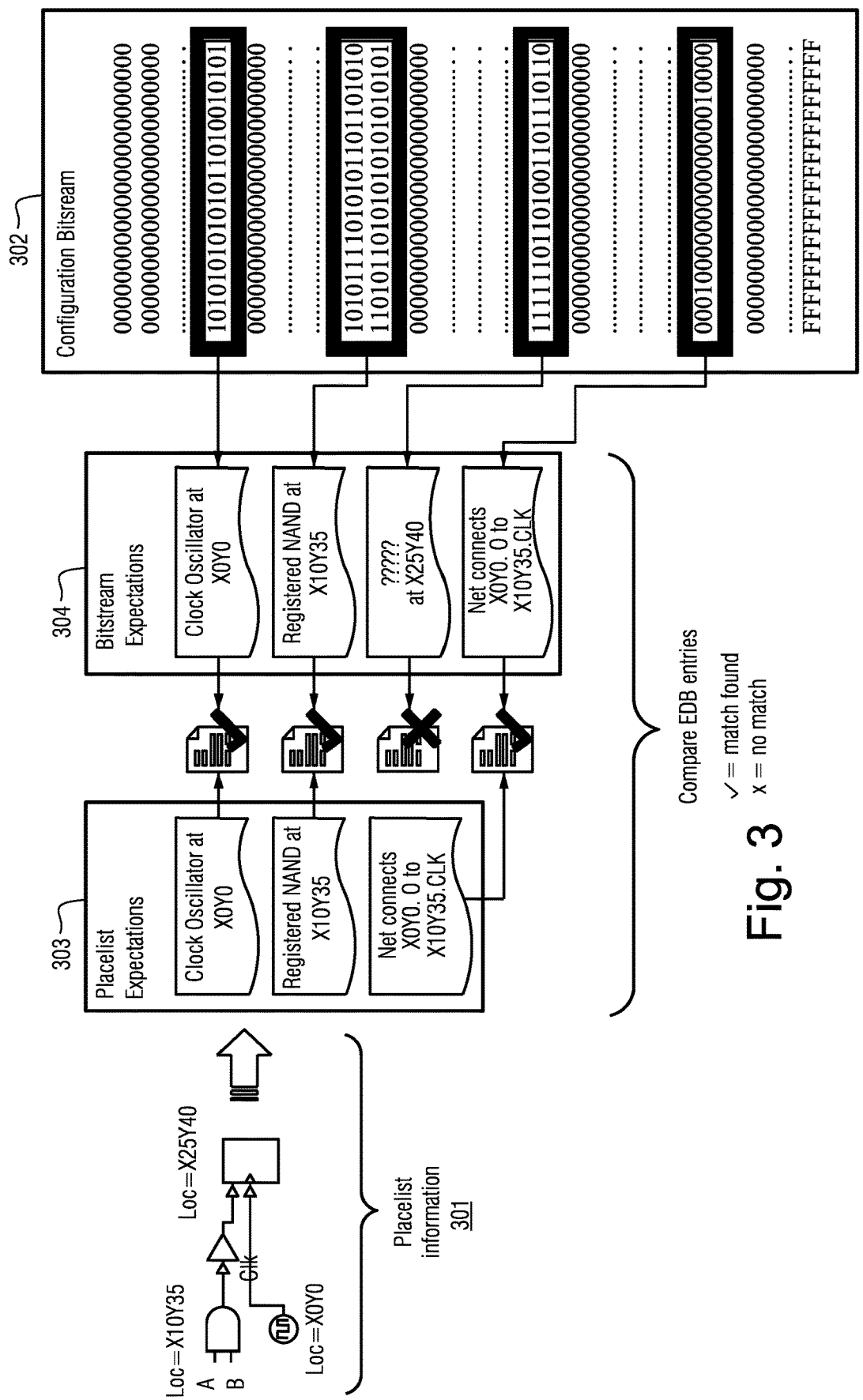
FIG. 3 is a schematic block diagram illustrating a non-limiting example process for implementing a Private Verification of an FPGA bitstream.

The diagram of FIG. 3 illustrates a basic information flow and processing overview for comparison of EDB data structures for implementing the Private Verification method for an FPGA Bitstream. Initially, Placelist information 301 comprising, for example, a placed physical netlist of logic element primitives and electrical connections between those elements for an FPGA, is parsed and developed into a set of Placelist Expectations 303. Likewise, a corresponding FPGA configuration Bitstream file 302 containing private design implementation information for the FPGA (typically provided in a proprietary formatted sequence of binary bits or bytes), is also parsed and developed into a set of Bitstream Expectations 304. These two sets of Expectations 303, 304 comprise encoded descriptive information which represents each of the individual "expected" physical resources (parts/primitives) and their associated die/chip geographical region/tile that are specified by the FPGA Placelist and the FPGA Bitstream. In the present example, respective sets/lists of Expectations 303, 304 are organized and stored in an Expectations Database (EDB) 220 as separate files of Placelist and Bitstream Expectation entries. After all of the Expectation entries 303, 304 are developed and entered into EDB 220, entries in the Placelist and Bitstream files are then compared against one another to search for and identify entries having matching primitive/part and location/placement information. Primitives/parts for which no match is found are also identified and reported.

Figure 4:
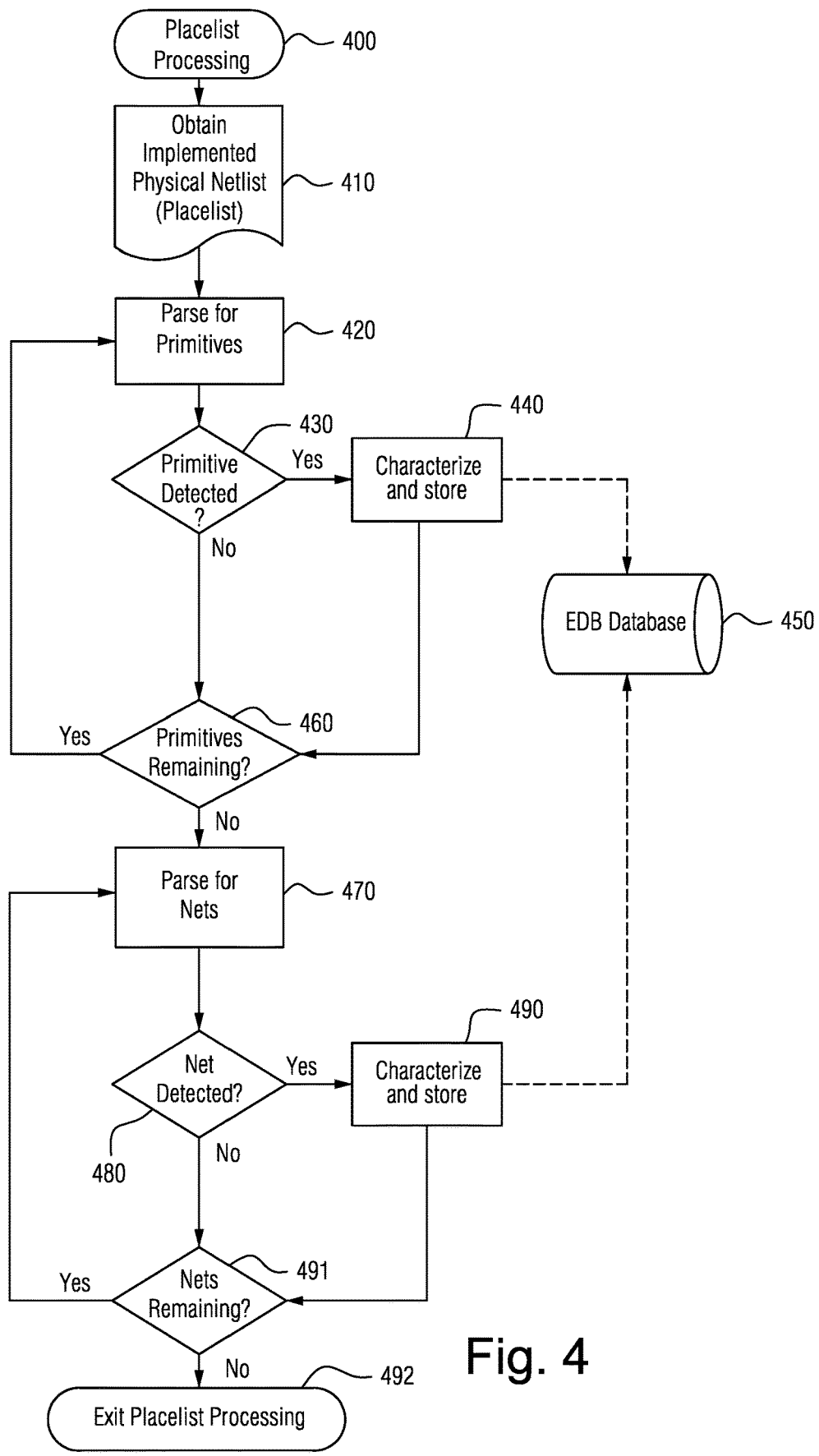
FIG. 4 is a flow diagram illustrating a non-limiting example process for generating a Placelist Expectations Database.

FIG. 4 is an example processing flow diagram illustrating exemplary steps/processes performed by PV-Bit utility/tool 200 for performing Placelist processing in which an FPGA Placelist is parsed for Primitives and Nets, which when identified are characterized by a functional description and respective chip position/location. These descriptive characterizations or "Expectations" are encoded and then stored in EDB 220. In the FIG. 4 example, the PV-Bit utility/tool begins the process of Placelist Processing (block 400) by obtaining and reading an input file/data 410 containing vendor produced public FPGA Placelist information for a particular FPGA device for which a trust assessment/verification is desired. Next, as indicated at block 420, the Placelist information is parsed for primitives indicative of a logic circuit/block/part and its chip/tile location. After parsing, each identified primitive (430) is characterized as a particular expected logic block/part with an associated chip/tile location and that characterization is then encoded as a binary data structure (a Placelist "Expectation"), as indicated at block 440, which is then is entered/stored into EDB 450 maintained within an accessible memory device. Parsing and detection of the Placelist for primitives at blocks 420 and 430 continues until all primitives have been detected or none remain, as indicated at block 460, then the Placelist is next parsed for information concerning the wires/connections ("Nets") of the FPGA circuit as indicated at block 470. Each detected Net (480) is characterized by its respective connection locations with logic blocks/parts within the FPGA and that characterization is then encoded as a binary data structure (a Bitstream "Expectation"), as indicated at block 490, which is then entered/stored into EDB 450. Parsing and detection of the Placelist for Net information at blocks 470 and 480 continues until all Nets have been identified or none remain, as indicated by block 491, and then the Placelist processing is ended and exited as indicated at block 492.

Figure 5:
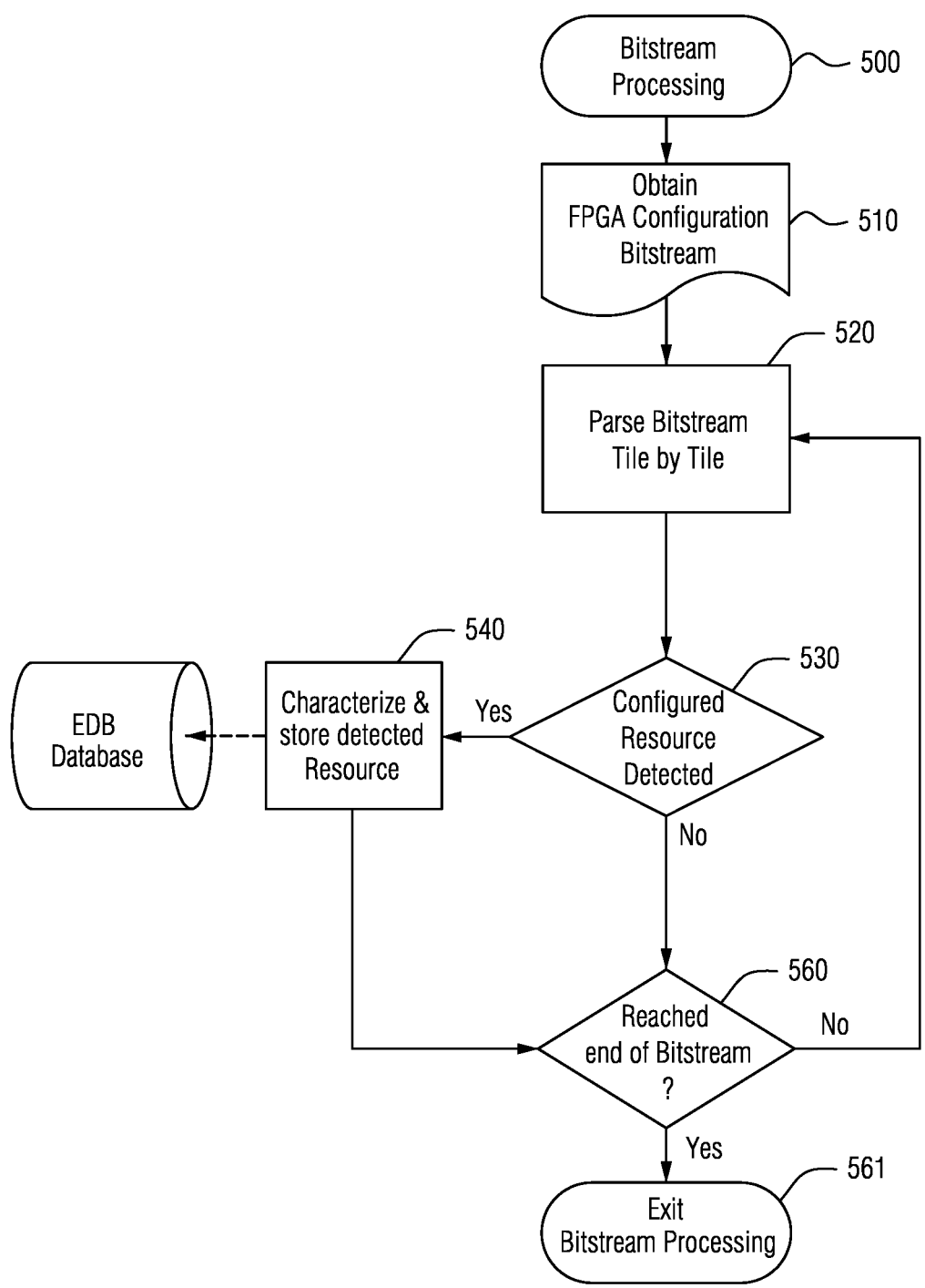
FIG. 5 is a flow diagram illustrating a non-limiting example process for generating a Bitstream Expectations Database.

FIG. 5 is an example processing flow diagram illustrating exemplary steps/processes performed by PV-Bit tool 200 for performing Bitstream processing in which the Bitstream data for the FPGA device for which the Placelist (201) was processed is parsed tile by tile to generate similarly characterized and encoded Bitstream Expectations and storing them in the EDB. Similar to the Placelist Processing 400 of FIG. 4, PV-Bit utility/tool 200 begins the process of Bitstream Processing (block 500) by obtaining and reading an input file/data, in this case, FPGA Configuration Bitstream file 510 containing the FPGA logic array block configuration information corresponding to the FPGA device for which the trust assessment/verification is desired. Next, as indicated at block 520, the Bitstream information is parsed tile by tile for identifiable configured FPGA resources (i.e., configurable logic blocks (CLB) or logic array block (LAB)). After parsing, as indicated at block 530, each identified CLB/LAB resource, is then characterized as a particular "expected" logic resource/part having an associated chip/tile location. That characterization (a "Bitstream Expectation") is encoded as a data structure and then entered/stored into the Expectations Database (EDB), as indicated at block 540. Parsing and detection of the Bitstream information continues as indicated by blocks 520 and 530 until the end of the Bitstream is reached, as indicated at block 560, and then Bitstream processing is ended and exited as indicated by block 561.

Figure 6:
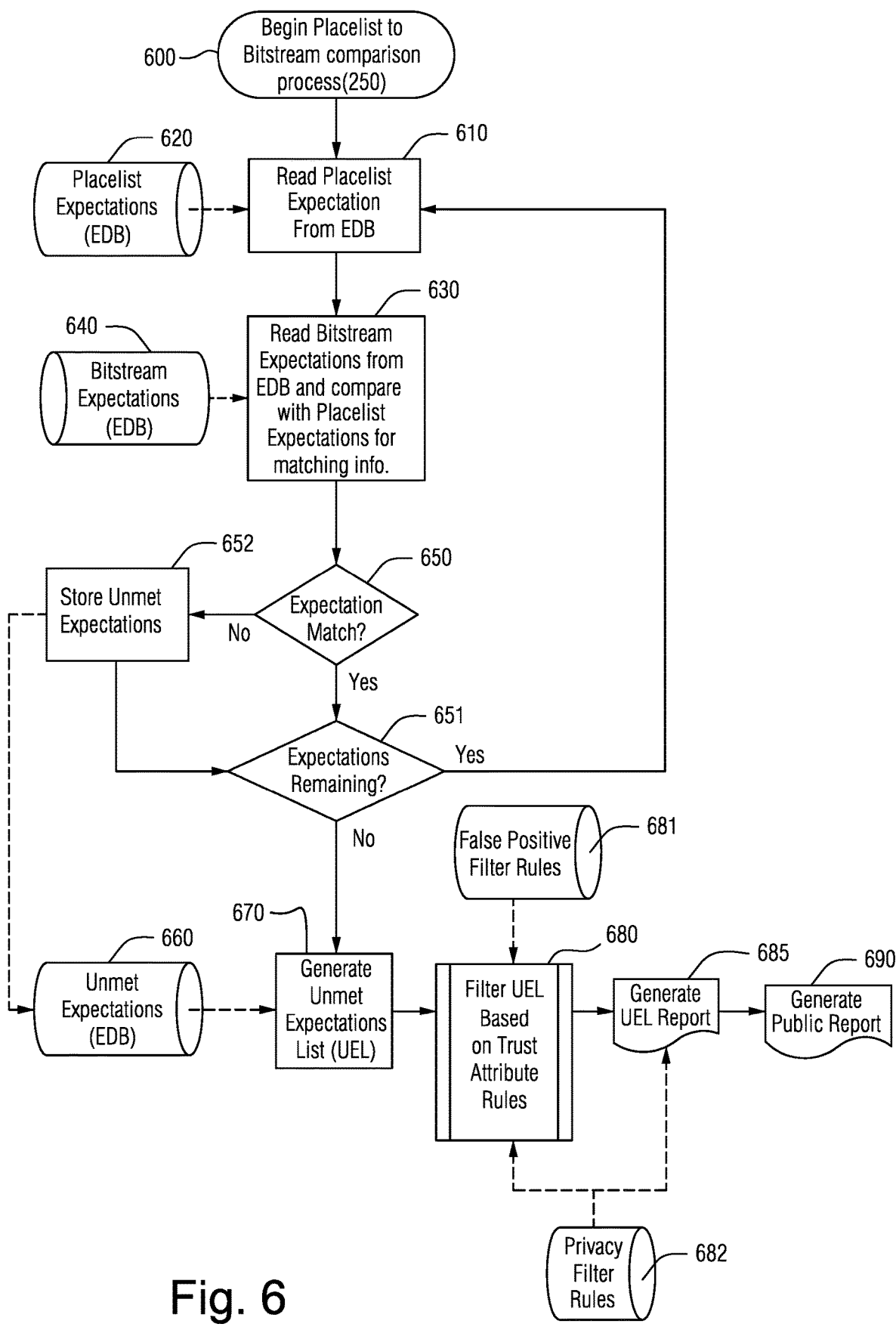
FIG. 6 is a flow diagram illustrating a non-limiting example process for comparing Placelist Expectations with Bitstream Expectations and filtering the results.

FIG. 6 is a flow diagram illustrating non-limiting example processes performed by PV-Bit 200 for comparing developed Placelist Expectations with developed Bitstream Expectations, filtering the results and generating a trust assessment/verification report. Block 600 indicates beginning an example process of comparing Placelist Expectations (303) to Bitstream Expectations (304). In this example, as indicated at block 610, Placelist Expectations 620 are read from the EDB, and then, as indicated at block 630, Bitstream Expectations 640 are read from the EDB and then compared to Placelist Expectations 620 to identify Expectation having matching characteristics. The reading and comparison of Expectations continues, as indicated at blocks 650 and 651, until all Placelist and Bitstream Expectations have been compared. As indicated at block 652, any remaining Expectation for which a matching Expectation could not be identified is marked or stored as an "Unmet" Expectation. For example, unmet expectations could either be individually marked in the EDB or be stored separately or stored elsewhere in some other way. A list of these "Unmet Expectations" (UEL) is also generated, as indicated at block 670, which may then be used to generate an internal filtered Unmet Expectations List/report 685 and ultimately output a public assessment/verification report (Public Report 690). It is contemplated that the output Public Report 690 not be limited to a printed or displayed report and may be any form of output which provides the user an indication of the trustworthiness of the design representations.

In addition to the Placelist-to-Bitstream comparison process, FIG. 6 also illustrates certain further processing, indicated at blocks 680-685, that is performed prior to generating Public Report 690. In this example, the Unmet Expectations List (UEL) generated from the comparison process is subjected to one or more heuristic filtering techniques, at block 680, which are based upon predetermined sets/types of trust attribute rules. For example, as indicated by 681, certain predetermined rules may be applied for filtering out false identifications/findings from the UEL that may be the result of benign optimizations or modifications that were made to the FPGA circuit and which do not effect trust concerns. Likewise, as indicated by 682, predetermined rules may also be applied for filtering out any proprietary or sensitive information (i.e., information likely to lead to easy reverse engineering of the Bitstream) from the generated UEL (670) and/or any further UEL report generated at 685. Ultimately, a filtered UEL report 685 is used to generate and output public report 690.

Alternative implementations of the PV-Bit utility/tool 200 are also contemplated by the inventors. For Example, as an alternative embodiment to the PV-Bit utility/tool 200 example shown in FIG. 2, the PV-Bit utility/tool may utilize/include a standalone EDB Generation Utility (EDB-Gen) 211 that functions to generate a Placelist information characterization artifact/file 221 directly from Placelist 201 (see dotted outline blocks in FIG. 2). The generated characterization artifact/file 211 contains encoded characterization information regarding the received Placelist information and operates in place of the expectations database (EDB). Preferably, artifact/file 211 is generated directly from the received Placelist information using a proprietary undisclosed one-way encoding function/process that precludes any direct or complete translation of the generated characterization information into a functional netlist. Alternatively, the format of the generated Placelist artifact/file 211 may be purposefully left undocumented or obfuscated or could be encrypted with a vendor key to thwart reverse-engineering of the characterization information therein. In this arrangement, the PV-Bit utility/tool 200 then operates using the generated Placelist characterization artifact/file 221, rather than directly upon the received Placelist 201 itself to generate Public Report 260 based upon the results of comparing the generated characterization information to expectations derived from the Bitstream data. The generated trusted Placelist EDB artifact/file 221 may also be used for performing an immediate trust assessment/verification of the generated bitstream or may be preserved and used at any future time where one would want to confirm bitstream integrity—e.g., after the FPGA device has been placed in the field.

The PV-Bit utility/tool 200 of this embodiment may also be configured to make a comparison between the generated EDB artifact/file and an ongoing live Bitstream being used to configure an FPGA. For example, this is accomplished by comparing the EDB artifact/file to an applied live Bitstream used to configure the Configuration-RAM (CRAM) plane of the FPGA while it is operating—e.g., by using the readback function of an FPGA CRAM. In this situation, any detected differences between the bitstream in the CRAM and Expectations stored in the EDB could also be transmitted elsewhere for further analysis. At least one example use of the forgoing embodiment is for embedded systems wherein a trusted EDB artifact/file may be used to verify trust for a configuration file that is stored in a BOOTROM used for the FPGA. In that situation, the FPGA design trust may be verified upon each booting to ensure that the FPGA BOOTROM has not malfunctioned or been subjected to tampering.

As an added or alternate implementation of the above embodiment, the EDB artifact/file 221 can be used for performing Third-party trust and integrity checks. It is a known and fairly common practice to provide a cryptographic checksum value using algorithms such as MD5 or SHA256 for large software downloads to allow a user to self-verify integrity of the downloaded file. For this example implementation, the generated Placelist EDB characterization artifact/file is used in a similar manner A system integrator or end-user is sent the characterization artifact/file via a side-channel. The PV-Bit utility/tool then uses this artifact/file to verify the integrity of the delivered Bitstream. This differs from a conventional cryptographic checksum in that PV-Bit utility/tool verifies the structure of the FPGA design representation instead of checking for an exact bit-to-bit data match. In addition, a cryptographic checksum may first also be used to determine if there are any bit level differences; and thereafter, if bit level differences are detected, the EDB artifact/file can then be used by the PV-Bit utility/tool to further characterize those differences.

In yet another embodiment of the above described PV-Bit utility/tool, only a partial/inexact EDB artifact/file is used to provide third-party design trustworthiness assessment/verification. Since the PV-Bit utility/tool disclosed herein is also capable of supporting a partial or inexact matching, trusted EDB artifact/file information may be used to selectively characterize predetermined portions of the Bitstream such that only certain specific features of the FGPA design representation are characterized while features/changes represented in other portions of the Bitstream are ignored. For example, a partial EDB artifact/file may be used to represent only certain security functions within the Bitstream which should be turned on, thereby ignoring all other functions contained within the Bitstream. Such an arrangement would allow the assessment/verification of an existing security subsystem without imposing restrictive requirements on the rest of the configuration. Using a partial/inexact EDB artifact/file also enables design trust to be verified upon partial Bitstreams that are swapped at runtime via partial reconfiguration of the device. Rapid partial/inexact EDB artifact/file checking of partial Bitstreams may also be applied to certain FPGA In-the-Data-Center applications where an FPGA device is rapidly reconfigured by partial Bitstreams which must fit within certain specific boundaries and maintain certain specific characteristics in order to function within the datacenter application. In addition, third-party vendors having their own IP to protect may each generate trusted partial artifacts/files representing just the trust characteristics required for/within their particular portions of the design. A system integrator would then aggregate all the relevant partial artifacts/files and run the PV-Bit utility/tool against the final Bitstream and the aggregated artifacts/files. System trust would thereby be verifiable without vendors having to expose their IP to the system integrator or any other vendor.

In yet another embodiment, the PV-Bit utility/tool described herein above is further configured to enable designers to tag design modules with their own particular trust attributes that are encoded into EDB characterization artifact/file 221. Many designs are partitioned across trust boundaries and it may not be necessary to verify the entire design, just the portions that need to be verified for trust. The Private Verification process provided by the PV-Bit utility/tool disclosed herein is applicable not only to physical netlists but also to any other description of features/properties that can be verified in the Bitstream. A property specification language is used to describe the expected properties of a design that an end user can then use to verify that the design functions as promised. Those properties can be reduced to expectations within the EDB. This can be used to describe properties regarding design safety when an FPGA firmware is being integrated into a larger system. For example, a system integrator would generate rules to ensure that a third-party firmware does not access I/O pins that would compromise system operation or ensure that internal access to configuration ports are disabled to prevent reconfiguration of the FPGA. Vendors benefit from avoiding the need to provide source information and risk having their IP reverse-engineered, while system-integrators can be assured the third-party IP doesn't violate design rules in a way that would adversely impact the system. The design safety language is also applicable to data-center and HPC applications where modules represented as FPGA partial bitstreams can be loaded by users who are not maintaining the hardware. Trust artifacts defined by the hardware maintainer would enable safe and trustworthy operation by ensuring that all trust characteristic metrics are met by the deployed Bitstream.

In yet another embodiment, the PV-Bit utility/tool includes an EDB Generation Utility (EDBGen) that is modular and supports plugins for different frontends. For this embodiment, The EDBGen frontends generate EDB characterization files for both the Placelist and the Bitstream and a separate comparison process utility, EDBCmp (not depicted), generates UEL reports documenting unmet expectations for both characterization files as compared to one another. Such a binary, undocumented, and potentially obfuscated or encrypted format would be at least as difficult to reverse engineer as the Bitstream itself and, moreover, contains no additional value for a malicious attacker attempting to extract proprietary data than either the Bitstream format itself or the openly specified Placelist format. At least one contemplated use of the EDB format for characterizing an FPGA design is as a sparse list of configured resources. The selected method to be used for describing and serializing this list of configured resources should be different from how the corresponding resources are represented in the Placelist or the Bitstream so as to maintain the one-way nature of the translation.

Figure 7:
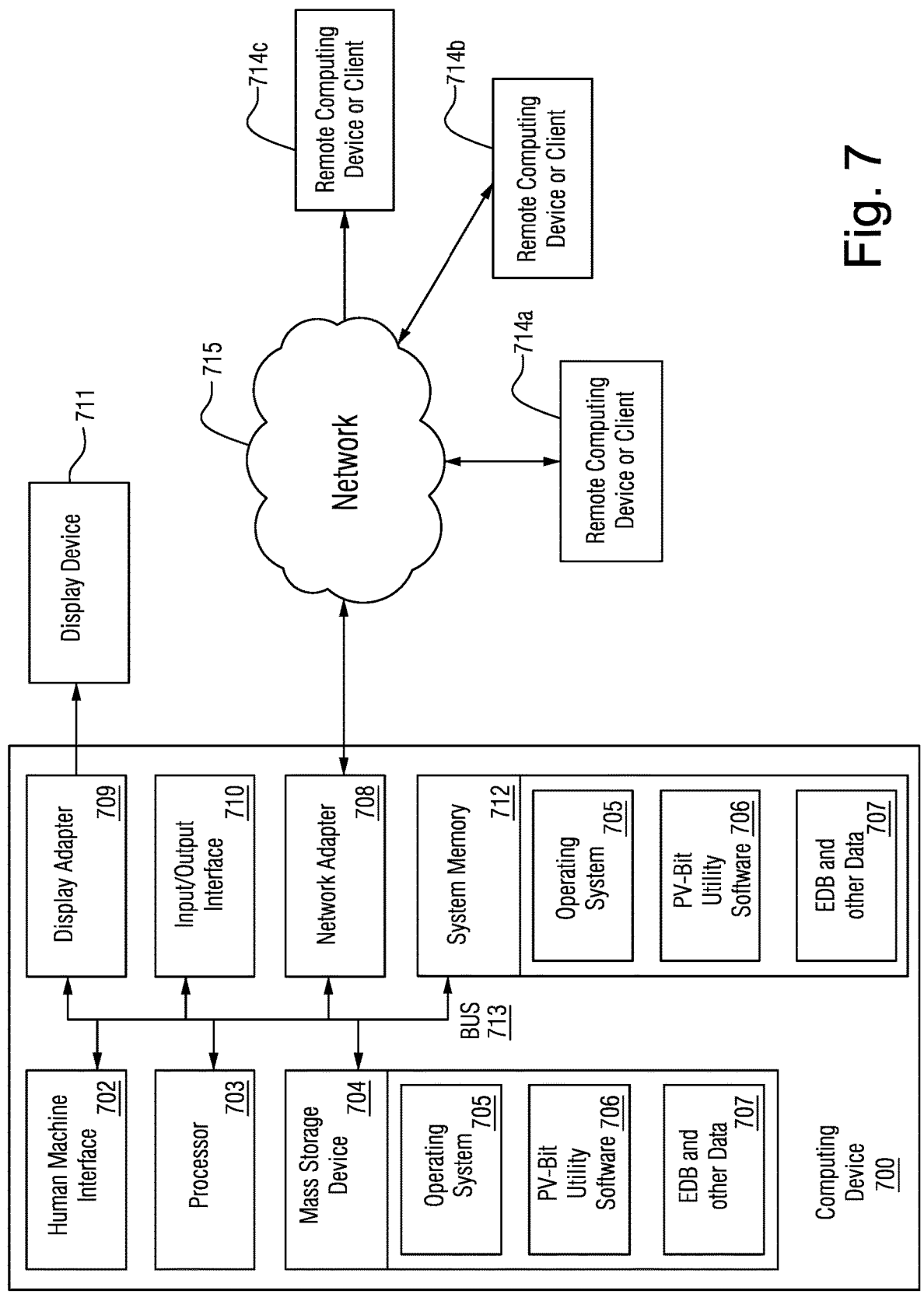
FIG. 7 illustrates a non-limiting example computer device and operating environment for executing a software utility implementation of the PV-Bit tool.

FIG. 7 illustrates a non-limiting example computing device 700 and operating environment for executing a software utility implementation of the PV-Bit tool 200 and/or for performing the disclosed method of PV Tool 100.

This example processing and operating environment is not intended to suggest any limitation as to the scope of use or functionality of an operating environment architecture. Neither should the operating environment be interpreted as having any dependency or requirement relating to any one or combination of components illustrated in the exemplary operating environment of FIG. 7.

The present method and processes described herein above can be operational with numerous other general purpose or special purpose computing system environments or configurations. Examples of well-known computing systems, environments, and/or configurations that can be suitable for use with the method and processes comprise, but are not limited to, personal computers, server computers, laptop devices, and multiprocessor systems. Additional examples comprise programmable consumer electronics, network PCs, mini-computers, mainframe computers, smart-grid components and distributed computing environments that comprise any of the above systems or devices, and the like.

The processing of the method and processes disclosed herein can be performed by software components. The disclosed method and processes can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the method and processes disclosed herein can be implemented via a computing device 700. The components of the computing device 700 may comprise, but are not limited to, one or more CPU/processors or processing units 703, a system memory 712, and a system bus 713 that couples various system components including the processor 703 to the system memory 712. Processing unit 703 as well as one or more other associated computing and memory/storage components may instantiated all in the same package, on the same die or within the programmable logic of an FPGA device itself. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, PV-Bit tool/utility software 706, EDB and other data 707, a network adapter 708, system memory 712, an Input/Output Interface 710, a display adapter 709, a display device 711, and a human-machine interface 702, can be contained within one or more remote computing devices or clients 714a,b,c at physically separate locations, connected through buses of this form, in effect implementing a fully distributed system or distributed architecture.

The disclosed example computing device 700 typically comprises a variety of computer readable media. Exemplary readable media can be any available media that is non-transitory and accessible by the computing device 700 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as an Expectations Database (EDB) including Placelist and Bitstream expectations data and/or characterization artifact/file data, and/or program modules such as an operating system 705 and PV-Bit tool/utility software 706 that are immediately accessible to and/or are presently operated on by processor 703. In one aspect, the system memory 712 contains computer executable code sections for performing processes/steps of accepting and parsing Placelist and Bitstream information, populating a database with encoded expectations/characterizations of the parsed Placelist and Bitstream information, comparing Placelist Expectations to Bitstream Expectations, creating a list or lists of Un-met Expectations, performing further analysis/filtering of Un-met Expectations, EDB data and/or other characterization/artifacts file data, and generating an output Public Report or other indication of trustworthiness of device design representations.

In another aspect, the computing device 700 can also comprise other non-transitory, removable/non-removable, volatile/non-volatile computer storage media. By way of example, FIG. 7 illustrates a mass storage device 704 that can provide non-volatile storage of computer code, computer readable instructions, data structures, program modules, and other data for the computing device 700. For example, and not meant to be limiting, mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on mass storage device 704, including by way of example, an operating system 705 and the PV-Bit tool/utility software 706. Each of the operating system 705 and PV-Bit tool/utility software 706 (or some combination thereof) can comprise elements of the PV-Bit tool 200 software. EDB and other PV-Bit utility data 707 can also be stored on the mass storage device 704. EDB and other PV-Bit data 707 can be stored in any of one or more databases known in the art. Examples of such databases comprise, DB2® (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, a custom database format, and the like. The databases can be centralized or distributed across multiple systems.

In another aspect, the user can enter commands and information into the computing device 700 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 703 via a human machine interface 702 that is coupled to the system bus 713, but can also be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computing device 108 can have more than one display adapter 709 and the computing device 108 can have more than one display device 711. For example, a display device can be a monitor, an LCD (Liquid Crystal Display), or a projector. In addition to the display device 711, other output peripheral devices can comprise components such as speakers (not shown) and a printer (not shown), which can be connected to the computer 108 via Input/Output Interface 710. Any step and/or result of the method and processes described herein can be output in any form to an output device. Such output can be any form of visual representation, including, but not limited to, textual, graphical, animation, audio, tactile, and the like.

The computing device 700 can operate in a networked environment using logical connections to one or more remote computing devices or clients 714a,b,c. By way of example, a remote computing device 714 can be a personal computer, portable computer, a server, a router, a network computer, a smart meter, a vendor or manufacture's computing device, smart grid components, a SCADA master, a DRMS processor, a DMS processor, a peer device or other common network node, and so on. Logical connections between the computing device 700 and a remote computing device or client 714a,b,c can be made via a local area network (LAN) and a general wide area network (WAN). Such network connections can be through a network adapter 708. A network adapter 708 can be implemented in both wired and wireless environments. Such networking environments are conventional and commonplace in offices, enterprise-wide computer networks, intranets, and other networks 715 such as the Internet, an AMI network, or the like.

For purposes of illustration, application processes/programs and other executable program/process components such as the operating system 705 are illustrated herein as discrete blocks, although it is recognized that such programs and components reside at various times in different storage components of the computing device 700, and are executed by the data processor(s) of the computer. An implementation of PV-Bit software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It is also contemplated that one or more of the example method and processes described herein and performed by the PV-Bit tool/utility, such as Bitstream-Placelist Expectations comparing or UEL filtering, may be implemented using known Artificial Intelligence techniques such as machine learning and iterative learning/analysis. Examples of such techniques include, but are not limited to, expert systems, case-based reasoning, Bayesian networks, behavior-based AI, neural networks, fuzzy systems and hybrid intelligent systems (e.g., Expert inference rules generated through a neural network or production rules from statistical learning).

As described above and as will be appreciated by one skilled in the art, embodiments of the present invention may be configured as a system, method, or computer program product. Accordingly, embodiments of the PV Tool disclosed herein may be comprised of various means including entirely of hardware, entirely of software, or any combination of software and hardware. For example, the entirety or portions of the PV-Bit utility/tool 200 may be implemented as an executable mobile app operable on a mobile or portable communications/computing device capable of wireless communications with cloud servers/processors and data storage for obtaining Placelist/Bitstream information and for performing one or more of the disclosed Placelist/Bitstream processing, parsing, expectations characterizing, comparing, list generating, filtering and report generating operations disclosed herein above. Furthermore, embodiments of the PV-Bit utility/tool 200 disclosed herein above may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the PV Tool have been described herein above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, smartphone, mobile computing device or other programmable data processing apparatus, such as the one or more processors 703 discussed above with reference to FIG. 7, to produce a machine, such that the instructions which execute on the computer or other programmable data processing apparatus create a means for implementing the functions and processes specified in one or more of the flowchart block or blocks disclosed herein.

These computer program instructions may also be stored in a computer-readable memory that can direct a computer or other programmable data processing apparatus (e.g., one or more processors 703 of FIG. 7) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks disclosed herein.

Accordingly, blocks of the block diagrams and flowchart illustrations of the FIGURES disclosed herein support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method or processes set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow, plain meaning derived from grammatical organization or punctuation, and the number or type of embodiments described in the specification.

Figure 8:
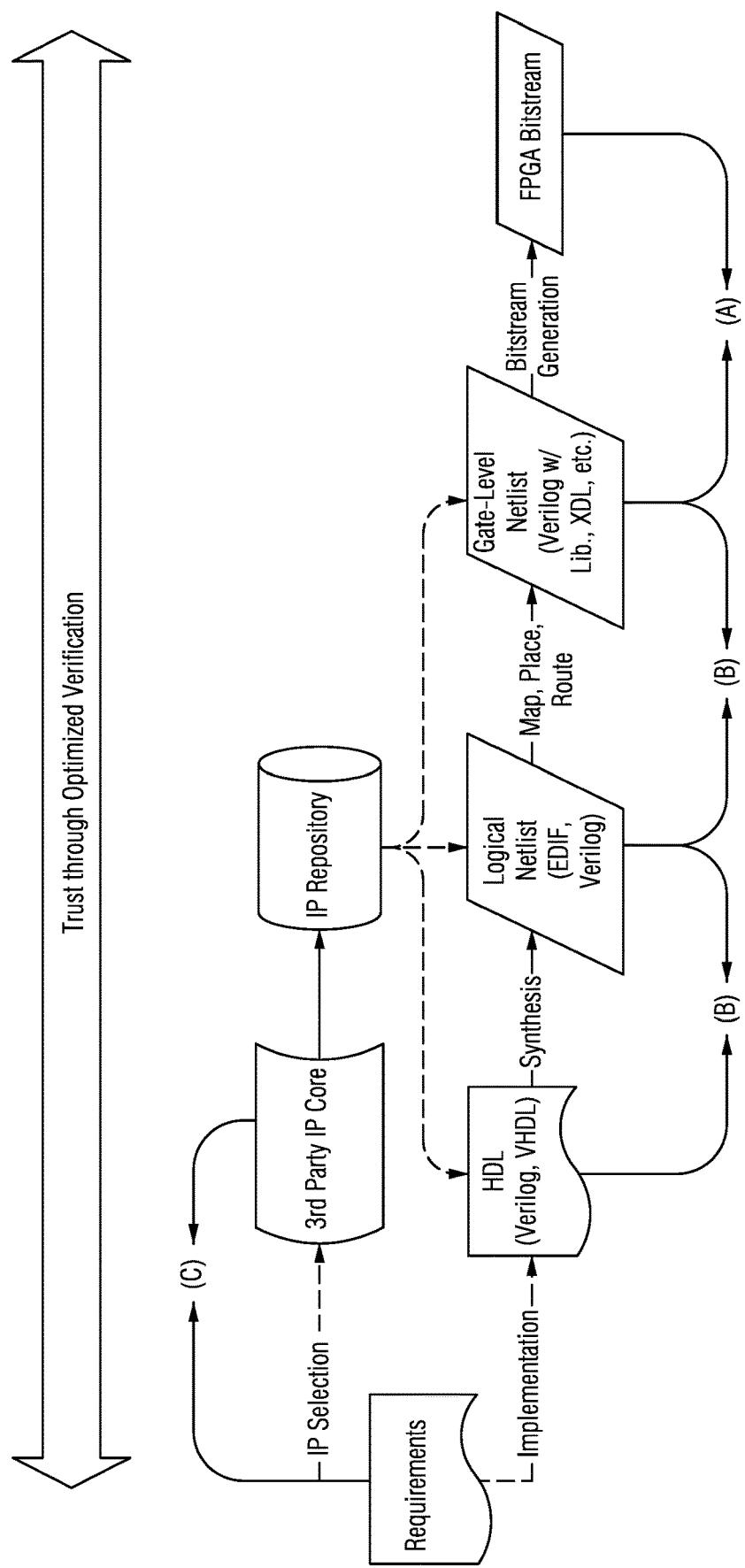
FIG. 8 is a schematic diagram illustrating a general overall scheme and methodology for implementing a comprehensive forward design trust for FPGA and other microelectronic device representation designs.

In FIG. 8, a schematic diagram illustrates a general overall scheme/methodology for implementing a comprehensive forward design trust for FPGA and other microelectronic device representation designs. This scheme/methodology anticipates the use of a blend of commercial EDA software and various custom trust analysis tools and techniques which operate at nodes (A), (B), (C) and (D) for developing and verifying trust in FPGA/microelectronic device Bitstreams, Gate-level Netlists, Logical Netlists, HDL as well as the 3rd-Party IP cores present in a particular device design. For example, the PV-Bit utility/tool described herein above, which is produced by Graf Research Corporation, fits neatly into the FIG. 8 scheme of forward design trust at node (A) and operates to efficiently bridge the existing technological gap between a trusted Gate-level Netlist and a corresponding FPGA device Bitstream—effectively bringing trust all the way into the Bitstream. Of course, in order to first realize a trusted Gate-level Netlist, other trust analysis techniques/tools should also be in play at nodes (B) and precede the use of the PV-Bit utility/tool at node (A). Graf Research Corporation also produces one or more of such node (B) analysis products/tools specifically tailored for providing trust assessment and/or verification of the synthesis process between HDL and logical netlists as well as for verifying the Map, Place, Route generating process between a logical netlist and a gate-level netlist.

While the technology herein has been described in connection with exemplary illustrative non-limiting implementations, the invention is not to be limited by the above disclosure. Although various embodiments are described herein above, it will be appreciated from the foregoing specification that various combinations of elements, variations or improvements therein may be made by those skilled in the art, and are within the scope of the invention. Therefore, it is intended that the invention not be limited to the particular embodiments disclosed as the best mode contemplated for carrying out this invention, but that the invention is intended to be defined by the claims and to cover all corresponding and equivalent arrangements whether or not specifically disclosed herein.

What is claimed is:

1. A computer-implemented method for assessing trustworthiness of a microelectronics device configuration including determining correct capture and translation of design intent for expected operation of a microelectronics device corresponding to the microelectronics device configuration, comprising:

receiving, in a computer, a publicly-documented, user-verifiable, binary data format of the microelectronics device configuration and a non-public, protected, binary data format of the microelectronics device configuration;

generating, by the computer, a set of public configuration expectations corresponding to the publicly-documented, user-verifiable, binary data format description of the microelectronics device configuration and a set of protected configuration expectations corresponding to the non-public, protected, binary data format of the microelectronics device configuration, each expectation providing a representation of an expected operation of a resource within a semiconductor chip configured with a sequence of binary bits or binary instructions contained within the publicly-documented, user-verifiable, binary data format description or the non-public, protected binary data format description of the microelectronics device configuration;

comparing, by the computer, each public configuration expectation with each protected configuration expectation to identify (i) matching public configuration expectations and protected configuration expectations and (ii) unmatched public configuration expectations and protected configuration expectations; and generating, by the computer, output information for the microelectronics device configuration based upon the comparing, wherein the output information provides an indication of trustworthiness of the microelectronics device configuration, wherein the indication of trustworthiness includes an assessment as to whether or not the design intent for the expected operation of the microelectronics device configuration is correctly captured, and wherein the output information is generated by the computer without having to expose proprietary details of the microelectronics device configuration or proprietary details of non-public, protected, binary protected data format corresponding to the microelectronics device configuration.

2. The method of claim 1, further comprising generating and storing, by the computer, the set of public configuration expectations, the set of protected configuration expectations, and/or the non-public, protected, binary data format of the microelectronics device configuration as encoded or encrypted data structures or as data structures having a predetermined proprietary binary format.

3. The method of claim 1, further comprising performing, by the computer, encryption, encoding, decryption, or decoding operations on the non-public, protected, binary data format as the microelectronics device configuration is received, protected configuration expectations are being generated, and/or as public and protected configuration expectations are being compared to generate output information including the indication of trustworthiness.

4. The method of claim 3, further comprising performing, by the computer, operations on an encrypted non-public, protected, binary data format and/or encrypted protected configuration expectations to generate output information including the indication of trustworthiness.

5. The method of claim 1, wherein the output information provides an indication of a presence or lack thereof of malicious or otherwise undesirable data structures or data operations within the non-public, protected, binary data format based on a comparison of the set of protected configuration expectations with an expectations database populated with a known set of configuration expectations corresponding to malicious or undesirable data structures or data operations.

6. The method of claim 1, further comprising generating, by the computer, a set of unmet expectations comprising (i) one or more unmatched public configuration expectations for which a corresponding protected configuration expectation is not found or (ii) one or more protected configuration expectations for which a corresponding public configuration expectation is not found.

7. The method of claim 6, further comprising filtering, by the computer, the set of unmet expectations using one or more artificial intelligence techniques.

8. The method of claim 7, wherein the one or more artificial intelligence techniques used to filter the set of unmet expectations are based upon a predetermined set of trust attribute rules or heuristic methods that dynamically adjust the filtering of the set of unmet expectations.

9. The method of claim 1, wherein the comparing of each public configuration expectation with each protected configuration expectation includes using one or more artificial intelligence techniques.

10. The method of claim 1, wherein the indication of trustworthiness is based upon (i) one or more public configuration expectations for which a corresponding protected configuration expectation is not found or (ii) one or more protected configuration expectations for which a corresponding public configuration expectation is not found.

11. The method of claim 1, wherein generating public configuration expectations or protected configuration expectations includes using one or more artificial intelligence techniques.

12. The method of claim 1, wherein the computer is a mobile computer or is contained in an information processing system, apparatus, or network of computers, and wherein generating of the set of public configuration expectations or the set of protected configuration expectations is implemented via an executable software application or utility stored or resident on the mobile computer, information processing system, apparatus, or network.

13. The method of claim 1, wherein the microelectronics device configuration is provided as a part of (i) a data exchange with a third-party entity, (ii) as an ongoing iterative and/or interactive process, or (iii) a completed microelectronics device configuration.

14. The method of claim 1, wherein the publicly-documented, user-verifiable, binary data format of the microelectronics device configuration includes placed-and-routed netlist information which corresponds to the microelectronics device configuration.

15. A non-transitory, computer-readable storage medium on which are stored computer-readable instructions which, when executed by a computer processor, cause the computer processor to assess trustworthiness of a microelectronics device configuration including determining correct capture and translation of design intent for expected operation of a microelectronics device corresponding to the microelectronics device configuration, by:
  receiving, in a computer, a publicly-documented, user-verifiable, binary data format of the microelectronics device configuration and a non-public, protected, binary data format of the microelectronics device configuration;
  generating, by the computer, a set of public configuration expectations corresponding to the publicly-documented, user-verifiable, binary data format description of the microelectronics device configuration and a set of protected configuration expectations corresponding to the non-public, protected, binary data format of the microelectronics device configuration, each expectation providing a representation of an expected operation of a resource within a semiconductor chip configured with a sequence of binary bits or binary instructions contained within the publicly-documented, user-verifiable, binary data format description or the non-public, protected binary data format description of the microelectronics device configuration;
  comparing, by the computer, each public configuration expectation with each protected configuration expectation to identify (i) matching public configuration expectations and protected configuration expectations and (ii) unmatched public configuration expectations and protected configuration expectations; and
  generating, by the computer, output information for the microelectronics device configuration based upon the comparing, wherein the output information provides an indication of trustworthiness of the microelectronics device configuration,
  wherein the indication of trustworthiness includes an assessment as to whether or not the design intent for the expected operation of the microelectronics device configuration is correctly captured, and
  wherein the output information is generated by the computer without having to expose proprietary details of the microelectronics device configuration or proprietary details of non-public, protected, binary protected data format corresponding to the microelectronics device configuration.

16. The non-transitory, computer-readable storage medium of claim 15, wherein the computer processor and the computer-readable instructions are instantiated on a same semiconductor device.

17. The non-transitory, computer-readable storage medium of claim 15, wherein the computer-readable instructions are implemented as an executable software application stored on a mobile computer or other information processing system, apparatus, or network.

18. A system to assess trustworthiness of a microelectronics device configuration including determining correct capture and translation of design intent for expected operation of a microelectronics device corresponding to the microelectronics device configuration, the system comprising:
  one or more computer input ports configured to receive a publicly-documented, user-verifiable, binary data format of the microelectronics device configuration and a non-public, protected, binary data format of the microelectronics device configuration;
  one or more memories to store the a publicly-documented, user-verifiable, binary data format of the microelectronics device configuration and the non-public, protected, binary data format of the microelectronics device configuration;
  one or more data processors, in communication with the one or more memories and the one or more computer input ports, wherein the one or more data processors is configured to:
    a set of public configuration expectations corresponding to the publicly-documented, user-verifiable, binary data format description of the microelectronics device configuration and a set of protected configuration expectations corresponding to the non-public, protected, binary data format of the microelectronics device configuration, each expectation providing a representation of an expected operation of a resource within a semiconductor chip configured with a sequence of binary bits or binary instructions contained within the publicly-documented, user-verifiable, binary data format description or the non-public, protected binary data format description of the microelectronics device configuration;
    compare each public configuration expectation with each protected configuration expectation to identify (i) matching public configuration expectations and protected configuration expectations and (ii) unmatched public configuration expectations and protected configuration expectations; and
    generate output information for the microelectronics device configuration based upon the comparing, wherein the output information provides an indication of trustworthiness of the microelectronics device configuration,
  wherein the indication of trustworthiness includes an assessment as to whether or not the design intent for the expected operation of the microelectronics device configuration is correctly captured, and
  wherein the one or more data processors is configured to generate the output information without having to expose proprietary details of the microelectronics device configuration or proprietary details of non-public, protected, binary protected data format corresponding to the microelectronics device configuration.

19. The system of claim 18, the one or more data processors is configured to generate and store in the one or more memories the set of public configuration expectations, the set of protected configuration expectations, and/or the non-public, protected, binary data format of the microelectronics device configuration as encoded or encrypted data structures or as data structures having a predetermined proprietary binary format.

20. The system of claim 18, wherein the one or more data processors is configured to perform encryption, encoding, decryption, or decoding operations on the non-public, protected, binary data format as the microelectronics device configuration is received, protected configuration expectations are being generated, and/or as public and protected configuration expectations are being compared to generate output information including the indication of trustworthiness.

21. The system of claim 20, wherein the one or more data processors is configured to perform operations on an encrypted non-public, protected, binary data format and/or encrypted protected configuration expectations to generate output information including the indication of trustworthiness.

22. The system of claim 18, wherein the output information provides an indication of a presence or lack thereof of malicious or otherwise undesirable data structures or data operations within the non-public, protected, binary data format based on a comparison of the set of protected configuration expectations with an expectations database populated with a known set of configuration expectations corresponding to malicious or undesirable data structures or data operations.

23. The system of claim 18, wherein the one or more data processors is configured to generate a set of unmet expectations comprising (i) one or more unmatched public configuration expectations for which a corresponding protected configuration expectation is not found or (ii) one or more protected configuration expectations for which a corresponding public configuration expectation is not found.

24. The system of claim 23, wherein the one or more data processors is configured to filter the set of unmet expectations using one or more artificial intelligence techniques.

25. The system of claim 24, wherein the one or more artificial intelligence techniques used to filter the set of unmet expectations are based upon a predetermined set of trust attribute rules or heuristic methods that dynamically adjust filtering of the set of unmet expectations.

26. The system of claim 18, wherein the one or more data processors is configured to compare of each public configuration expectation with each protected configuration expectation using one or more artificial intelligence techniques.

27. The system of claim 18, wherein the one or more data processors is configured to generate public configuration expectations or protected configuration expectations using one or more artificial intelligence techniques.

28. The system of claim 18, wherein the system is a mobile computer, is part of an information processing system, apparatus, or network of computers, and generation of the set of public configuration expectations or the set of protected configuration expectations is implemented via an executable software application or utility stored or resident on the mobile computer, information processing system, apparatus, or network.

29. The system of claim 18, wherein the microelectronics device configuration is provided as a part of (i) a data exchange with a third-party entity, (ii) as an ongoing iterative and/or interactive process, or (iii) a completed microelectronics device configuration.

30. The system of claim 18, wherein the publicly-documented, user-verifiable, binary data format of the microelectronics device configuration includes placed-and-routed netlist information which corresponds to the microelectronics device configuration.

* * * * *